3,248,356
MULTISPERSE ACRYLIC LATEXES
Walter C. Snyder, Freeport, Tex., assignor to The Dow Chemical Company, Midland, Mich., a corporation of Delaware
No Drawing. Filed Sept. 26, 1963, Ser. No. 311,629
20 Claims. (Cl. 260—29.6)

This invention relates to improved latexes of polymeric materials of monomeric, acrylic esters. More particularly, it relates to polymeric latexes having greatly improved flow and leveling properties due to the presence therein of a controlled amount of large polymeric particles and a controlled amount, as based on the amount of large particles, of small polymeric particles. In addition, the invention comprehends the process for preparing such polymeric latexes.

It has been known for some time that aqueous, polymeric latexes are particularly valuable vehicles for use in the preparation of coating compositions. For use in such compositions, there are numerous requirements and specifications, such as freeze-thaw stability, mechanical stability, rheology, etc., that must be met and many considerations, such as particle size, non-volatile solids content, color, etc., that must be taken into account in the evaluation of the latex for the intended use. These manifold requirements and considerations are known to the skilled worker.

One category of coating compositions wherein aqueous, polymeric latexes have found definite acceptance is that group of compositions known popularly as latex paints. The polymeric latex itself has included the solid polymer phase dispersed in an aqueous, continuous phase which usually contains a surface-active agent and a protective colloid used in the preparation of the latex. Also, in the paint formulation there frequenly is employed a post-stabilizer to impart stability of the aqueous, polymer latex dispersion to the inclusion of the other ingredients and to impart mechanical and storage stability to the polymeric latex. Still another ingredients that is commonly included is a thickener which is concerned with the rheological properties of the formulated paint. Other conventional ingredients include the pigments, defoamers, preservatives, and others. It is well known to the paint formulator that each separate ingredient used in the preparation of the latex ultimately presents a formulating problem of its own. It would be desirable if the number of these additives could be reduced while retaining or improving the community of latex properties necessary for commercial acceptance of a latex formulation.

A group of polymers which are known to have properties that would indicate their use for many coating applications includes the polymers of monomeric, acrylic esters. However, the latexes of such polymeric materials have always fallen short of many of the desirable properties and characteristics. For example, those acrylic ester polymeric materials have not heretofore been satisfactory in formulations wherein high gloss is desired.

Accordingly, it is the principal object of this invention to provide improved latexes of polymeric materials of monomeric, acrylic esters.

Another object is to provide such latexes with excellent flow and leveling properties.

Another object is to provide gloss and semi-gloss latexes.

Another object is to provide latexes with controlled amounts of large and small polymer particles.

And still another object is to set forth a process whereby such improved latex compositions may be prepared.

Other objects will appear hereinafter.

The above and related objects are achieved with an improved, polymeric latex composition of monomeric, acrylic esters prepared by a procedure wherein the particle size of the polymeric particles is controlled. That is, the latex will contain a certain controlled amount of large polymeric particles and a controlled amount, as based on the amount of large polymeric particles, of small polymeric particles. By "large polymeric particles," as the expression is used herein, is meant particles of a size in the range of from about 0.4 to 1.0 micron. By "small polymeric particles," as the expression is used herein, is meant particles of a size in the range of from about 0.05 to 0.1 micron.

The desired polymeric latex compositions cannot be prepared by simple admixing or otherwise blending of two separate aqueous, organic, polymeric, latex dispersion compositions wherein one latex contains the large particles and the other latex contains the small particles.

The acrylic esters used in preparing the multisperse, polymeric, latex compositions of the present invention may be prepared (A) from about 45 to about 70 percent by weight of at least one polymerizable, monomeric, acrylic ester which is an ester of acrylic acid and a primary alkanol of from 1 to 8 carbon atoms; (B) from about 25 to about 55 weight percent of at least one polymerizable, monomeric, methacrylic ester which is an ester of methacrylic acid and a primary alkanol of from 1 to 8 carbon atoms; and (C) from about 2.5 to about 5 weight percent and preferably from about 3.5 to about 4 weight percent of one polymerizable, monomeric, $\alpha,\beta$-monoethylenically unsaturated, monocarboxylic acid, i.e., methacrylic acid.

Typical of the polymerizable, monomeric, acrylic ester compounds which may be employed to advantage in preparing the controlled particle size, organic, polymeric, latex compositions of the present invention are methyl acrylate, ethyl acrylate, propyl acrylate, isopropyl acrylate, butyl acrylate, isobutyl acrylate, sec.-butyl acrylate, amyl acrylate, isoamyl acrylate, hexyl acrylate, 2-ethylhexyl acrylate, lauryl acrylate, octyl acrylate, and the like. Polymerizable, monomeric, methacrylic ester compounds employed to advantage with the above-named, acrylic ester compounds include methyl methacrylate, ethyl methacrylate, propyl methacrylate, isopropyl methacrylate, butyl methacrylate, isobutyl methacrylate, sec.-butyl methacrylate, amyl methacrylate, sec.-amyl methacrylate, hexyl methacrylate, 2-ethylbutyl methacrylate, 2-ethylhexyl methacrylate, lauryl methacrylate, octyl methacrylate, and the like.

One of the typical, aqueous, acrylic, resinous, polymeric, latex dispersions that is prepared in the practice of the present invention is a quaternary polymer latex containing approximately 52.5 weight percent of polymerized ethyl acrylate, about 38.7 weight percent of polymerized methyl methacrylate, about 5.9 weight percent of polymerized butyl acrylate, and about 2.9 weight percent of polymerized methacrylic acid.

Another of such aqueous, acrylic, resinous, polymeric, latex dispersions is a ternary, polymeric latex composed of the copolymerization product, in percent by weight, of about 37.4 percent of methyl methacrylate, about 59 percent of 2-ethylhexyl acrylate, and about 3.6 percent of methacrylic acid.

Emulsifiers pursuant to conventional practice are usually required for the combination of monomers employed in the present practice and to maintain the formed polymeric latexes in stable dispersions. The amounts of emulsifiers required depend primarily on the concentration of monomers to be handled and, to a further extent, with the choice of emulsifiers, monomers, and proportions of monomers. Generally, the amount of emulsifying agent required falls between about 0.5 percent and about 12 weight percent of the mixture of monomers.

Typical emulsifying agents which may be used include such nonionic agents as the alkyl phenoxy polyethoxyethanols having alkyl groups of about 7 to about 12 carbon atoms; polyethoxyethanol derivatives of methylene linked alkyl phenols; condensation products of ethylene oxide with higher alkyl mercaptans having alkyl groups of about 9 carbon atoms; condensation products of ethylene oxide with alkyl thiophenols having alkyl groups of about 6 to about 15 carbon atoms; and anionic agents, such as alkali metal salts of alkyl benzene sulfonic acids and alkyl toluene sulfonic acids having aliphatic side chains of about 10 to about 15 carbon atoms; and the like. Of particular suitability for present purposes, however, is the emulsifier, dioctyl sodium sulfosuccinate, obtained as "Triton GR-5."

However, the controlled particle size, organic, polymeric latexes of the present invention may also be prepared as is known in the art without employing an emulsifying agent in the polymerization process.

As polymerization catalysts, there may be used one or more peroxides which are known to act as free-radical catalysts and which are water soluble. Usually convenient are the persulfates (including ammonium, sodium, and potassium persulfates), hydrogen peroxide, or the perborates or percarbonates. There may also be used organic peroxides, either alone or in addition to an inorganic peroxide compound. Typical organic peroxides include benzoyl peroxide, tert.-butyl hydroperoxide, cumene peroxide, acetyl peroxide, caproyl peroxide, tert.-butyl perbenzoate, tert.-butyl diperphthalate, methyl ethyl ketone peroxide, and the like.

The choice of an inorganic or organic peroxide catalyst depends in part upon the particular combination of monomers to be polymerized. As might be expected, some of the monomers respond better to one type of catalyst than the other. The usual amount of catalyst required is roughly from about 0.01 percent to about 3.0 percent by weight as based on the weight of the monomer mixture.

In some instances, in order to effect polymerization at a temperature below that at which coagulation of the latex might occur, it may be desirable to activate the catalyst. The activation may be best accomplished by using a redox system in which a reducing agent within the limits of about 0.001 percent to about 6.0 percent as based on the weight of the mixture of monomers is present in addition to the peroxide catalyst. Many examples of such redox systems are known. Agents, such as hydrazine or a soluble oxidizable sulfoxy compound, including the alkali metal salts of hydrosulfites, sulfoxalates, thiosulfates, sulfites, and bisulfites, and the like can be employed. Redox systems may be activated by the presence of a small amount (a few parts per million) of polyvalent methyl ions. Ferrous ions are commonly and effectively used or a tertiary amine which is soluble in the reaction medium may also be used as an activator.

Polymerization of various suggested monomers to produce the controlled particle size, polymeric latexes of the present invention may be commonly effected below about 80° C., although somewhat higher temperatures are permissible. After most of the monomers have been converted to the copolymer, temperatures even higher than 80° C. may be applied. During polymerization, the temperature may be controlled in part by the rate at which the monomers are supplied and interpolymerized and/or by applied cooling.

The emulsion polymerization method of the present invention is most advantageously performed batchwise. It is accordingly desirable to work entirely batchwise, emulsifying a portion of the entire charge of monomers in water containing a water-soluble polymerization catalyst and then proceeding with the initial polymerization. Thus, it is well to start with about one-third (⅓) part of the total monomer charge which is to be used and add the remaining two-thirds (⅔) part of the charge of monomer or monomers following the initial polymerization period (i.e., after the addition to the reaction system of an emulsifying agent, and prior to the final polymerization reaction). An advantage of gradual monomer addition of each charge of monomer lies in reaching a high solids content with optimum control and with maximum uniformity of product.

The emulsion polymerization process for preparing the controlled particle size latexes of the present invention usually commences with the addition of a water-soluble polymerization catalyst to the aqueous reaction medium in a suitably equipped reaction vehicle while purging the reaction atmosphere with an inert gas, such as nitrogen or methane. When the contents of the reactor reach a temperature of about 80° C. to about 88° C., the gradual addition of about one-third (⅓) of the monomer mixture is started and continued until the aqueous phase becomes hazy or cloudy. The cloudy coloration of the aqueous phase may commence to appear at any point during the admixing of from about 3 to about 5 percent or more of the total monomer charge. Polymerization is then allowed to proceed without further addition of monomer for about one hour.

At this stage of the instant emulsion polymerization process, a water-soluble emulsifier is added to the reaction mixture. After the addition of the emulsifier, the two-thirds (⅔) balance of charge of monomers is added while continuing polymerization to bring the content of the dispersed copolymer to from about 25 percent to about 60 percent of the total dispersion, preferably to from about 45 percent to about 55 percent. Polymerization should be carried on at temperatures maintained at from about 80° C. to about 88° C. until no more than a few percent of monomers remain in the mixture. This can frequently be achieved in approximately 3 to 4 hours.

When all of the monomer mixture has been added to the continuous, aqueous phase, the copolymer latex is generally allowed to further polymerize without upsetting the reaction conditions by the addition of more ingredients. This uninterrupted reaction period is generally referred to in emulsion polymerization processes as the digestion stage. It usually assists the attainment of the desired polymeric latex in good yield.

This digestion stage is usually continued for approximately one hour. It may be most conveniently performed while maintaining the temperature within a range of from about 80° to about 90° C.

Before cooling the aqueous, polymeric latex dispersion, the media is commonly rendered mildly alkaline in a pH range of from about 8 to about 8.5. This may be done by adding ammonia or a water-soluble amine or an inorganic base, such as potassium or ammonium hydroxide, or a mixture thereof. Ammonium hydroxide, usually giving the best results in the least complicated way, is often preferred.

Having permitted the alkaline, aqueous, polymer latex dispersion to cool to room temperature, the polymer latex product can be separated from undesirable impurities by filtering the latex particles through a stainless steel filter having the filter surface perforated to correspond with the standard 16 mesh size of the U.S. Standard Sieve Series.

The filtered polymer latexes prepared by the process described above and containing from about 25 to about 50, and preferably from about 45 to about 55, weight percent of non-volatile, polymeric, latex solids and having a specific gravity of from about 1.00 to about 1.08, can advantageously be commingled with small amounts of thickening agents, antifoaming agents, film preservatives, pigment extenders, etc., in the preparation of a superior latex coating composition also in accordance with the present invention. To these instant formulated acrylic polymer latex coating compositions may also be added, as a stabilizing agent, sufficient ammonium hydroxide to adjust the pH of the latex dispersion to from about 8 to about 8.5 to assure adequate shelf life of the coating compositions, if any of the additives should tend to partially acidify the formulation below a pH of 8 during storage.

The process of this invention will be described in greater detail in the following examples which are intended for purposes of illustration only and are not regarded as limitations to the appended claims. In the examples all parts are given by weight.

EXAMPLE I

Into a reaction vessel equipped with a means for stirring, temperature control, purging, and refluxing was placed 1400 grams of water. The water was heated to 85° C. under a methane purge whereupon a solution containing 1.5 grams of sodium persulfate dissolved in 50 milliliters of water and ⅓ of a mixture of 780 grams of ethyl acrylate, 87 grams of butyl acrylate, 574.5 grams of methyl methacrylate, and 57.4 grams of methacrylic acid was added. The vessel was then maintained at about 85° C. for about 18 minutes. At the end of this period, 10 grams of dioctyl sodium sulfosuccinate which is an anionic emulsifier, and a solution containing 0.5 gram of sodium persulfate dissolved in 50 milliliters of water was added. Immediately thereafter, the remaining ⅔ portion of mixed monomers was added at such a rate that the addition was completed in 60 minutes. During this latter monomer addition, the temperature rose to 90° C. Upon completion of the reaction, as evidenced by a slow drop in temperature, one part of a 1:1 $NH_4OH$-$H_2O$ solution per 100 parts of wet latex was added. The resultant latex contained a particle distribution as follows:

95 percent by volume of 0.45–0.60 micron
5 percent by volume of 0.05–0.10 micron.

Referring to Example I, it is noted that the formulation includes ethyl acrylate, butyl acrylate, methyl methacrylate, and methacrylic acid. With regard to the monomer selection, several points should be observed:

(1) The methacrylic acid must be present in each formulation in an amount of at least 2.5 percent as biased on the total monomer charge, and preferably in the range of from 3.5 to 4 percent.

(2) The alkyl methacrylate may be used alone with only the methacrylic acid present if the alkyl portion of the alkyl methacrylate contains from 4 to 8 carbon atoms. If a 1, 2, or 3 carbon atom alkyl methacrylate is used, it is generally necessary to employ a 1 to 4 carbon atom alkyl acrylate. The amount of alkyl acrylate employed will be determined by the properties desired in the final product. The relationship between the 1 to 3 carbon atom alkyl methacrylate and the 1 to 4 carbon atom alkyl acrylate is shown in the following table. It is further pointed out that mixtures of 2 or more alkyl acrylates containing 1 to 4 carbon atoms may be employed to meet the above mentioned requirement.

|  | At Least percent $C_1$-Acrylate | At Least percent $C_2$-Acrylate | At Least percent $C_3$-Acrylate | At Least percent $C_4$-Acrylate |
|---|---|---|---|---|
| Methyl Methacrylate | 85 | 60 | 55 | 50 |
| Ethyl Methacrylate | 70 | 50 | 45 | 40 |
| Propyl Methacrylate | 65 | 45 | 40 | 35 |

(3) The emulsion phase during the reaction is best maintained if one of the alkyl acrylate esters contains 4 or more carbon atoms in the alkyl portion. If large and small particles are to be present in the desired size and amount, it is essential that the procedure employed in the examples be used. Simply preparing latexes with certain particle sizes and thereafter admixing two of these will not produce the multisperse latex of the present invention.

EXAMPLE II

Into a reaction vessel equipped with a means for stirring, temperature control, purging, and refluxing was placed 500 grams of water. The water was heated to 85° C. under a methane purge whereupon a solution containing 0.40 gram of sodium persulfate dissolved in 50 milliliters of water, 62 grams of methyl methacrylate, 100 grams of 2-ethylhexyl acrylate, and 6 grams of methacrylic acid was added. The vessel was then maintained at about 85° C. for about 45 minutes. At the end of this period, 0.40 gram of dioctyl sodium sulfosuccinate and a solution containing 0.80 gram of sodium persulfate dissolved in 50 milliliters of water, were added. Immediately thereafter, 125 grams of methyl methacrylate, 195 grams of 2-ethylhexyl acrylate, and 12 grams of methacrylic acid were added at such rate that the addition was completed in 45 minutes. The mixture in the vessel was then digested for 105 minutes and neutralized with 35 milliliters of 28 percent ammonium hydroxide. The latex retained its dilatent property and paints compounded therewith retained their dilatent property and exhibited excellent flow and leveling properties. The resultant latex contained a particle distribution as follows:

95 percent by volume of 0.45–0.60 micron
5 percent by volume of 0.05–0.10 micron.

The large polymeric particles will be present in the polymeric latexes of the present invention in a concentration of approximately 95 percent by volume. However, they can and will vary from about 90 percent to about 97 percent. The small particles will, correspondingly, constitute the remainder of the latex composition depending upon the percentage of large particles present.

EXAMPLE III

Part A

The equipment, emulsion polymerization procedure and reaction ingredients of Example I were employed with the exception of the elimination of the emulsifier, dioctyl sodium sulfosuccinate. The resultant polymeric product had a particle size distribution of 100 percent of from 0.45–0.6 micron with an average particle size distribution of about 0.55 micron.

Part B

A pigment slip containing:

| Ingredients: | Parts by weight |
|---|---|
| Titanium dioxide pigment[a] | 100.0 |
| Water | 50.0 |
| Sodium salt of a condensed sulfonic acid (25% solution)[b] | 1.0 |
| Aliphatic substituted butyne diols and octyndiols (20% in ethanol)[c] | 5.0 |
| Methylcellulose ether having a viscosity of 15 cps. (5% aqueous solution) | 20.0 |

[a] "Ti-Pure R–610" titanium dioxide.
[b] "Tamol 731," a dispersing agent.
[c] "Surfynol 102," antifoaming agent, represented by the formula

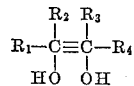

wherein $R_1$, $R_2$, $R_3$ and $R_4$ are aliphatic radicals having molecular weights of from 200–225.

was prepared by grinding the above-described ingredients on a pebble mill for about 16 hours to a degree of fineness having a value of from 7–8 on a Gardner Laboratories pigment grind gauge.

Thereafter, a white, high-gloss, latex enamel was prepared by thoroughly mixing 44 parts by weight of the above-prepared pigment slip with 200 parts by weight of the latex of Example III, Part A, composed, in percent by weight, of about 52 percent of ethyl acrylate, about 5.8 percent of butyl acrylate, about 38.4 percent of methyl methacrylate, and about 3.8 percent of methacrylic acid.

*Part C*

A white, semi-gloss, latex enamel was prepared by thoroughly mixing 88 parts by weight of the pigment slip prepared as in Part B above with 200 parts by weight of the latex prepared in Part A above.

EXAMPLE IV

*Part A*

Into a reaction vessel equipped with means for stirring, temperature control, purging, and refluxing was placed 1400 grams of water. The water was heated to about 85° C. under a methane purge whereupon 10 grams of dioctyl sodium sulfosuccinate was added. Thereafter, a solution of about 2.0 grams of sodium persulfate dissolved in 50 milliliters of water and the monomer charge containing a mixture of 780 grams of ethyl acrylate, 87 grams of butyl acrylate, 574.5 grams of methyl methacrylate, and 57.4 grams of methacrylic acid was added by admitting the monomer charge into the reaction media continuously. The monomer addition was completed over a period of about 60 minutes, during such time the temperature rose to about 90° C. Upon completion of the polymerization reaction, as evidenced by a slow drop in temperature, one part of 1:1 $NH_4OH$-$H_2O$ solution per 100 parts of wet latex was added. The latex product, thus obtained, had a particle size distribution of 100 percent of from 0.09–0.10 micron. This latex product was found to be extremely thick and pasty.

*Part B*

A white, high-gloss, latex enamel was prepared from the latex product of Part A immediately above by employing the procedure and pigment slip set forth in Example III, Part B.

*Part C*

A white, semi-gloss enamel was prepared from the latex product of Part A immediately above by employing the procedure and pigment slip as set forth in Example III, Part C.

EXAMPLE V

*Part A*

To 95 parts by volume of the latex product prepared in Example III, Part A, having a particle size distribution of 100 percent of from 0.45–0.6 micron was thoroughly blended 5 parts by volume of the latex product prepared in Example IV, Part A, having a particle size distribution of 100 percent of from 0.09–0.10 micron.

*Part A–1*

Subsequently, a white, high-gloss, latex enamel was prepared as in Example III, Part B, by employing the above-described latex blend product of Part A above.

*Part A–2*

Also, a white, semi-gloss, latex enamel was prepared as in Example III, Part C, by employing the above-described latex blend product of Part A above.

EXAMPLE VI

In like manner as shown in Example V, Parts A, A–1, and A–2, latex enamels were prepared wherein the ratio of large latex particles to small latex particles was varied. The following Table I gives the quantities of the two different particle size latexes blended.

TABLE I

Parts by volume

| Latex of Example III—Part A | Latex of Example IV—Part A |
|---|---|
| 90 | 10 |
| 85 | 15 |
| 80 | 20 |
| 75 | 25 |
| 70 | 30 |
| 65 | 35 |
| 60 | 40 |
| 55 | 45 |
| 50 | 50 |
| 45 | 55 |
| 40 | 60 |
| 35 | 65 |
| 30 | 70 |
| 25 | 75 |
| 20 | 80 |
| 15 | 85 |
| 10 | 90 |
| 5 | 95 |

EXAMPLE VII

*Part A*

A pigment slip containing

| Ingredients: | Parts by weight |
|---|---|
| Titanium dioxide pigment [a] | 100.0 |
| Water | 50.0 |
| Sodium salt of a condensed sulfonic acid (25% solution) [b] | 1.0 |
| Aliphatic substituted butynediols and octyndiols (20% in ethanol) [c] | 5.0 |
| Methylcellulose ether having a viscosity of 15 cps. (5% aqueous solution) | 20.0 |

[a], [b] and [c]—See Example III, Part B.

was prepared by grinding the above-described ingredients on a pebble mill for about 16 hours to a degree of fineness having a value of from 7–8 on a Gardner Laboratories pigment grind gauge.

Thereafter, a white, high-gloss, latex enamel was prepared by thoroughly mixing 44 parts by weight of the above-prepared pigment slip with 200 parts by weight of the latex product of Example I having a latex particle size distribution of 95 percent by volume of from 0.45–0.60 micron and 5 percent by volume of from 0.05–0.10 micron.

*Part B*

A white, semi-gloss, latex enamel was prepared by throroughly mixing 88 parts by weight of the pigment slip prepared in accordance with the procedure set forth in Part A immediately above with 200 parts by weight of the latex product of Example I having a latex particle size distribution of 95 percent by volume of from 0.45–0.60 micron and 5 percent by volume of from 0.05–0.10 micron.

EXAMPLE VIII

*Part A*

A white, high-gloss, latex enamel was prepared by intimately mixing 44 parts by weight of the pigment slip of Example VII, Part A, with 200 parts by weight of the latex product of Example II composed, in percent by weight, of 37.4 percent of methyl methacrylate, 59 percent of 2-ethylhexyl acrylate, and 3.6 percent of methacrylic acid. Such latex product having a particle size distribution of 95 percent by volume of from 0.45–0.60 micron and 5 percent by volume of from 0.05–0.10 micron.

*Part B*

A white, semi-gloss, latex enamel was prepared by intimately mixing 88 parts by weight of the pigment slip prepared in accordance with the procedure set forth in Example VII, Part A, with 200 parts by weight of the latex product of Example II as characterized by the latex composition set forth in Part A immediately above.

The flow and leveling characteristics of the paints, prepared to illustrate the improved latex products of the present invention, were determined by brushing out each latex enamel on a hiding power chart (a product of Gardner Laboratories) and thereafter making an "X" mark with the brush in the center of the coated chart. Each enamel sample was then allowed to dry and was subsequently observed after drying for the persistance or disappearance of the "X" mark. If the "X" mark had disappeared, the latex enamel was considered to possess good flow and leveling properties.

In Example VII, Part A and Part B, and Example VIII, Part A and Part B, the "X" mark on each dried coating surface had disappeared which indicated good flow and leveling characteristics of the paints prepared from the multisperse latexes of the present invention.

In the samples of paints made from the latex-pigment formulations of Example III, Part B and Part C; Example IV, Part B and Part C; Example V, Part A–1 and Part A–2; and in all the samples of paints made from the latex-pigment formulations of Example VI, the "X" mark did not disappear which indicated poor flow and leveling characteristics of those paints prepared from blends of two latexes, one having large size latex particles and the other latex having small size latex particles.

It will be understood that the invention is susceptible to modification in order to adapt it to different usages and conditions and, accordingly, it is desired to comprehend such modifications within the invention as may fall within the scope of the appended claims.

What is claimed is:

1. An emulsion polymerization process for preparing an aqueous, homogeneous, colloidal dispersion of acrylic, resinous, polymeric latex having from about 25 to about 60 percent by weight of non-volatile solids, said latex being composed of from about 90 to about 97 percent by volume of discrete resinous particles having an average diameter of from 0.4 to 1.0 micron and from about 3 to about 10 percent by volume of discrete resinous particles having an average diameter of from 0.05 to 0.1 micron, said process comprising the sequential steps of: (1) heating water containing a water-soluble polymerization catalyst in an inert atmosphere to a temperature of up to about 85° C.; (2) continuously adding about ⅓ of the monomer mixture; (3) continuing reaction without interruption under established reaction conditions for a period of at least 15 minutes; (4) adding to said reaction media a water solution of a water-soluble, anionic emulsifier and an aqueous catalyst solution; (5) adding the remaining portion of monomer mixture steadily over a period of at least 45 minutes; (6) allowing the reaction to proceed without interruption for about one hour while maintaining the reaction temperature within the range of from about 80° C. to about 90° C; and (7) adjusting the alkalinity of the reaction media to a pH within the range of from 8 to 8.5 with a water-soluble alkaline compound prior to cooling of the latex product.

2. The process of claim 1, wherein said acrylic, resinous, polymeric latex is the copolymerization product, in percent by weight, of (A) from about 2.5 to about 5 percent of methacrylic acid, and (B) from about 95 to about 97.5 percent of a $C_4$ to $C_8$ carbon atom alkyl ester of methacrylic acid selected from the group consisting of n-butyl methacrylate, isobutyl methacrylate, sec.-butyl methacrylate, amyl methacrylate, sec.-amyl methacrylate, hexyl methacrylate, 2-ethylbutyl methacrylate, 2-ethylhexyl, methacrylate, lauryl methacrylate and octyl methacrylate.

3. The process of claim 1, wherein said acrylic, resinous, polymeric latex is the copolymerization product, in percent by weight, of (A) from 2.5 to about 5 percent of methacrylic acid, (B) at least 85 percent of methyl acrylate, with (C) the remainder of said product being methyl methacrylate.

4. The process of claim 1, wherein said acrylic, resinous, polymeric latex is the copolymerization product, in percent by weight, of (A) from 2.5 to about 5 percent of methacrylic acid, (B) at least 60 percent of ethyl acrylate, with (C) the remainder of said product being methyl methacrylate.

5. The process of claim 1, wherein said acrylic, resinous, polymeric latex is the copolymerization product, in percent by weight, of (A) from 2.5 to about 5 percent of methacrylic acid, (B) at least 55 percent of propyl acrylate, with (C) the remainder of said product being methyl methacrylate.

6. The process of claim 1, wherein said acrylic, resinous, polymeric latex is the copolymerization product, in percent by weight, of (A) from 2.5 to about 5 percent of methacrylic acid, (B) at least 50 percent of butyl acrylate, with (C) the remainder of said product being methyl methacrylate.

7. The process of claim 1, wherein said acrylic, resinous, polymeric latex is the copolymerization product, in percent by weight, of (A) from 2.5 to about 5 percent of methacrylic acid, (B) at least 70 percent of methyl acrylate, with (C) the remainder of said product being ethyl methacrylate.

8. The process of claim 1, wherein said acrylic, resinous, polymeric latex is the copolymerization product, in percent by weight, of (A) from 2.5 to about 5 percent of methacrylic acid, (B) at least 50 percent of ethyl acrylate, with (C) the remainder of said product being ethyl methacrylate.

9. The process of claim 1, wherein said acrylic, resinous, polymeric latex is the copolymerization product, in percent by weight, of (A) from 2.5 to about 5 percent of methacrylic acid, (B) at least 45 percent of propyl acrylate, with (C) the remainder of said product being ethyl methacrylate.

10. The process of claim 1, wherein said acrylic, resinous, polymeric latex is the copolymerization product, in percent by weight, of (A) from 2.5 to about 5 percent of methacrylic acid, (B) at least 40 percent of butyl acrylate, with (C) the remainder of said product being ethyl methacrylate.

11. The process of claim 1, wherein said acrylic, resinous, polymeric latex is the copolymerization product, in percent by weight, of (A) from 2.5 to about 5 percent of methacrylic acid, (B) at least 65 percent of methyl acrylate, with (C) the remainder of said product being propyl methacrylate.

12. The process of claim 1, wherein said acrylic, resinous, polymeric latex is the copolymerization product, in percent by weight, of (A) from 2.5 to about 5 percent of methacrylic acid, (B) at least 45 percent of ethyl acrylate, with (C) the remainder of said product being propyl methacrylate.

13. The process of claim 1, wherein said acrylic, resinous, polymeric latex is the copolymerization product, in percent by weight, of (A) from 2.5 to about 5 percent of methacrylic acid, (B) at least 40 percent of propyl acrylate, with (C) the remainder of said product being propyl methacrylate.

14. The process of claim 1, wherein said acrylic, resinous, polymeric latex is the copolymerization product, in percent by weight, of (A) from 2.5 to about 5 percent of methacrylic acid, (B) at least 35 percent of butyl acrylate, with (C) the remainder of said product being propyl methacrylate.

15. An aqueous, colloidal dispersion of a multisperse, particulate, acrylic, resinous, polymeric latex, said multisperse, particulate latex being comprised, in percent by volume, of from about 90 to about 97 percent of large polymeric latex particles having an average diameter of from about 0.4 to 1.0 micron and from about 3 to about 10 percent of small polymeric latex particles having an average diameter of from about 0.05 to 0.1 micron, said multisperse, particulate latex particles being composed of from about 45 to about 55 weight percent of non-volatile solids of the copolymerization product, in percent by weight, of (A) about 52.5 percent of ethyl acrylate, (B) about 38.7 percent of methyl methacrylate, (C) about 5.9 percent of butyl acrylate, and (D) about 2.9 percent of methacrylic acid.

16. An aqueous, colloidal dispersion of a multisperse, particulate, acrylic, resinous, polymeric latex, said multisperse particulate latex being comprised, in percent by volume, of from about 90 to about 97 percent of large polymeric latex particles having an average diameter of from about 0.4 to 1.0 micron and from about 3 to about 10 percent of small polymeric latex particles having an average diameter of from about 0.05 to 0.1 micron, said multisperse, particulate, latex particles being composed of from about 45 to about 55 weight percent of non-volatile solids of the copolymerization product, in percent by weight, of (A) about 37.4 percent of methyl methacrylate, (B) about 59 percent of 2-ethylhexyl acrylate, and (C) about 3.6 percent of methacrylic acid.

17. The aqueous, colloidal dispersion of a multisperse, particulate, acrylic, resinous, polymeric latex of claim 15, also having dispersed therein a compatible, aqueous, pigment dispersion.

18. The aqueous, colloidal dispersion of a multisperse, particulate, acrylic, resinous, polymeric latex of claim 16, also having dispersed therein a compatible, aqueous, pigment dispersion.

19. A latex-based paint of the aqueous, colloidal dispersion of a multisperse, particulate, acrylic, resinous, polymeric latex of claim 15.

20. A latex-based paint of the aqueous, colloidal dispersion of a multisperse, particulate, acrylic, resinous, polymeric latex of claim 16.

References Cited by the Examiner

UNITED STATES PATENTS 2,954,358   9/1960   Hurwitz _____ 260—29.6
3,057,812   10/1962  Straughan et. al. ____ 260—29.6

SAMUEL H. BLECH, *Primary Examiner.*